(12) United States Patent
Hu et al.

(10) Patent No.: US 12,333,686 B1
(45) Date of Patent: Jun. 17, 2025

(54) ZERO-SHOT LOW-DOSE CT IMAGE DENOISING METHOD AND APPARATUS BASED ON STRIP DIFFUSION MODEL

(71) Applicant: HUBEI LUOJIA LABORATORY, Hubei (CN)

(72) Inventors: Xiangyun Hu, Hubei (CN); Bo Su, Hubei (CN); Yunfei Zha, Hubei (CN); Jun Wan, Hubei (CN); Jiabo Xu, Hubei (CN)

(73) Assignee: HUBEI LUOJIA LABORATORY, Hubei (CN)

( * ) Notice: Subject to any disclaimer, the term of this patent is extended or adjusted under 35 U.S.C. 154(b) by 0 days.

(21) Appl. No.: 19/017,812

(22) Filed: Jan. 13, 2025

(30) Foreign Application Priority Data

Sep. 6, 2024 (CN) .......................... 202411245470.4

(51) Int. Cl.
*G06T 5/60* (2024.01)
*G06T 5/70* (2024.01)

(52) U.S. Cl.
CPC .................. *G06T 5/60* (2024.01); *G06T 5/70* (2024.01); *G06T 2207/10081* (2013.01); *G06T 2207/20021* (2013.01); *G06T 2207/20076* (2013.01); *G06T 2207/20081* (2013.01); *G06T 2207/20084* (2013.01); *G06T 2207/30004* (2013.01); *G06T 2207/30168* (2013.01)

(58) Field of Classification Search
CPC ... G06T 5/60; G06T 5/70; G06T 2207/10081; G06T 2207/20021; G06T 2207/20076; G06T 2207/20081; G06T 2207/20084; G06T 2207/30004; G06T 2207/30168
USPC ........................................................ 382/131
See application file for complete search history.

(56) References Cited

PUBLICATIONS

Gao, Qi, et al. "CoreDiff: Contextual error-modulated generalized diffusion model for low-dose CT denoising and generalization." IEEE Transactions on Medical Imaging 43.2 (2023): 745-759. (Year: 2023).*

(Continued)

*Primary Examiner* — Jonathan S Lee
(74) *Attorney, Agent, or Firm* — JCIP GLOBAL INC.

(57) ABSTRACT

The present disclosure provides a zero-shot low-dose Computed Tomography (CT) image denoising method and apparatus based on strip diffusion model. This method includes building a strip diffusion model which uses high fidelity of the diffusion model to complete end-to-end denoising of low-dose CT images with different doses, thicknesses and devices. Particularly, in the training process, only the normal-dose CT images are required, greatly reducing the data reliance of the model, and model training across dose and thickness condition can be carried out with the data of only one scenario. In a sampling process, strip scanning strategy is used in combination with overlapped strip information and the input low-dose CT images to solve the maximum a posteriori problem, thereby sequentially generating denoising results. The present disclosure only uses simple convolution and attention architecture and carries out extensive experiments on the datasets involving different doses and thicknesses.

10 Claims, 3 Drawing Sheets

(56) References Cited

PUBLICATIONS

Xu, Rui, Yunke Wang, and Bo Du. "MAEDiff: Masked Autoencoder-enhanced Diffusion Models for Unsupervised Anomaly Detection in Brain Images." arXiv preprint arXiv:2401.10561 (2024). (Year: 2024).*

Zhao, Peiang, et al. "DiffULD: diffusive universal lesion detection." International Conference on Medical Image Computing and Computer-Assisted Intervention. Cham: Springer Nature Switzerland, 2023. (Year: 2023).*

* cited by examiner

ZERO-SHOT LOW-DOSE CT IMAGE DENOISING METHOD AND APPARATUS BASED ON STRIP DIFFUSION MODEL

CROSS-REFERENCE TO RELATED APPLICATION

This application claims the priority benefit of China Application Serial Number 202411245470.4, filed on Sep. 6, 2024. The entirety of the above-mentioned patent application is hereby incorporated by reference and made a part of this specification.

BACKGROUND

Technical Field

The present disclosure relates to the field of medical Computed Tomography (CT) image processing and in particular to a zero-shot low-dose CT image denoising method and apparatus based on strip diffusion model.

Description of Related Art

The low-dose CT can reduce the risk of patients' exposure to radiation and extend the service life of the x-ray tube. However, the artifacts and noises in the low-dose CT may lower the image quality, potentially affecting subsequent diagnosis. In recent years, the supervised image post-processing method has been widely studied due to its denoising effectiveness. The low-dose CT image denoising method and system based on fast diffusion model needs to obtain paired low-dose and normal-dose CT images to complete model training. But the clinical condition for obtaining the paired normal-dose and low-dose CT images is extremely stringent, limiting the practical application and wide use of the supervised method.

Figure 1:
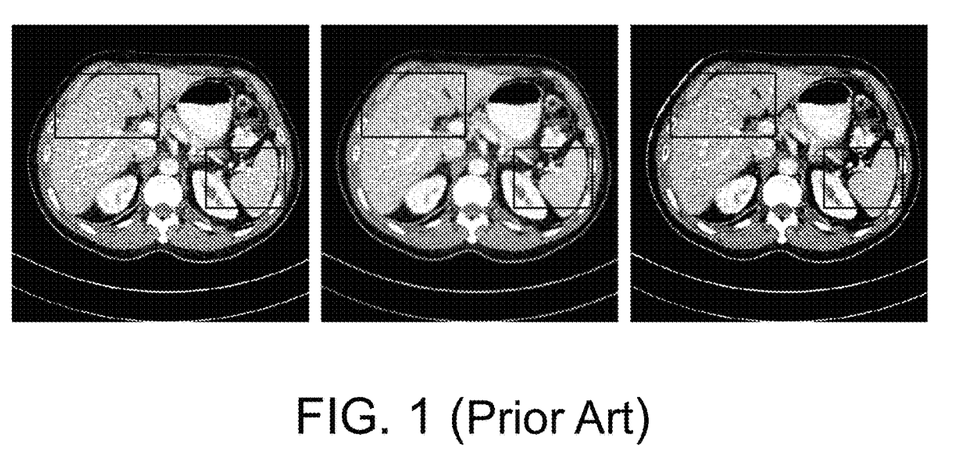
FIG. 1 is a comparison diagram illustrating a low-dose image in the prior arts, an interpolated image and a VAE model-processed image.

Furthermore, the clinical environment requires the CT images to be scanned with different thicknesses and doses or on different devices, which poses higher requirements for generality of the model. In the existing methods, consideration is only given to single scanning solution while imaging differences under different scanning protocols are neglected, leading to data limitation. Further, interpolation may lead to loss of key details, which brings negative impact to the subsequent diagnosis. FIG. 1 illustrates a raw image, an interpolated image and an image processed by a Variational Autoencoder (VAE) model. The VAE model may, after encoding and decoding, introduce additional honeycomb artifacts and detail blurring. The medical images have more high-frequency information and the latent-space processing method of the AVE damages a huge number of details, failing to satisfy the requirement of details retention in the suppression task of the CT noise artifacts. In addition, the direct prediction of the diffusion model on the entire image significantly increases the complexity of the model training, and poses a challenge for obtaining a result consistent with vision perception.

SUMMARY

For the problems in the prior arts, the present disclosure provides a zero-shot low-dose Computed Tomography (CT) image denoising method and apparatus based on strip diffusion model.

The technical solution of the present disclosure includes the followings.

A first aspect provides a zero-shot low-dose CT image denoising method based on strip diffusion model, which includes:

obtaining a normal-dose CT image under a conventional scanning condition, and based on a computed tomography dose index (CTDI) value of the normal-dose CT image under the conventional scanning condition, obtaining low-dose CT images with CTDI values being a preset ratio of the CTDI value of the normal-dose CT image and obtaining low-dose CT images with different thicknesses;

building a strip diffusion model, the strip diffusion model comprising a forward diffusion structure and a backward inference structure; wherein the forward diffusion structure is configured to add noise gradually to an input normal-dose image by Markov chain to obtain a pure noisy image, and the backward inference structure is configured to divide an input CT image into different strips based on UNet model and at the same time, by backward inference, denoise each strip gradually to generate a denoised strip sequentially, and splice the generated denoised strips into a denoising result; wherein an overlap rate is set between the strips;

inputting the obtained normal-dose CT image into the strip diffusion model, and by mean square loss function, calculating a difference between the noise added by the forward diffusion structure and a noise predicted by the UNet model to train the entire strip diffusion model;

inputting the obtained low-dose CT images with the CTDI values being the preset ratio of the CTDI value of the normal-dose CT image as test data into the trained strip diffusion model to obtain a denoised low-dose CT image.

In one embodiment, a probability distribution of the noisy image of the t-th step obtained by the forward diffusion structure is:

$$q(x_t|x_{t-1})=N(x_t;\sqrt{1-\beta_t}*x_{t-1},\beta_t);$$

wherein $\beta_t$ is a Gaussian noise variance added at the t-th step, N is a Gaussian distribution, $x_t$ is a noisy image obtained at the t-th step, $x_{t-1}$ is a noisy image obtained at the (t−1)-th step, and $q(x_t|x_{t-1})$ is a probability distribution of $x_t$ with $x_{t-1}$ known.

In one embodiment, the UNet model comprises an encoder, a middle layer, a decoder, a time encoder and a position encoder; the encoder comprises a 3×3 convolutional block and an upsampling convolutional module, the middle layer comprises a convolutional layer, the decoder comprises a 3×3 convolutional block and a downsampling convolutional module, the time encoder is configured to encode a current time, and the position encoder is configured to encode a current strip; wherein time-encoded and position-encoded features are fused and then added to the middle layer of the UNet model, the last layer of the encoder and the last layer of the decoder.

In one embodiment, the noise predicted by the UNet model is calculated as below:

$$\hat{\varepsilon}^0=UNet(x^0,0)$$

$$\hat{\varepsilon}^k=UNet(ax^{k-1},k)$$

wherein $x^0$ is a null value, $\hat{\varepsilon}^0$ is a noise predicted for the first strip, k is a number of strips divided, a is an overlap rate, $x^{k-1}$ is a content of the (k−1)-th strip, and $\hat{\varepsilon}^k$ is a noise predicted for the k-th strip.

In one embodiment, the 3×3 convolutional block is a residual network block, the input of the encoder is the noisy image $x_t$ obtained at the t-th step; after rich feature information is calculated by the residual network block, a smaller-size feature map is obtained by the downsampling convolutional module; then, by the middle layer, a more advanced feature representation $x_{mid}$ is learnt and input into the decoder; after the feature map is calculated by the residual network block, the upsampling convolutional module restores image detail structure to obtain a final output feature map.

In one embodiment, by skip connection, the encoder and the decoder add up corresponding encoder blocks and feature map blocks of the decoder.

In one embodiment, the low-dose CT images with the CTDI values being 25% and 50% of that of the normal-dose CT image are input as test data into the trained strip diffusion model to obtain the denoised low-dose CT image, which comprises:

based on the low-dose CT images in the test data, performing strip-by-strip sampling; wherein for a first strip, the denoising result is obtained with the null value and the content of the low-dose CT image as condition, and for the subsequent strips, the denoised low-dose CT image is obtained by introducing partial information of the previous strip for the subsequent strips, and then splicing each denoised strip in an order.

Based on the same invention idea, a second aspect of the present disclosure provides a zero-shot low-dose CT image denoising apparatus based on strip diffusion model, which includes:

a data obtaining module, configured to obtain a normal-dose CT image under a conventional scanning condition, and based on a CTDI value of the normal-dose CT image under the conventional scanning condition, obtain low-dose CT images with CTDI values being a preset ratio of the CTDI value of the normal-dose CT image and obtain low-dose CT images with different thicknesses;

a model building module, configured to build a strip diffusion model comprising a forward diffusion structure and a backward inference structure; wherein the forward diffusion structure is configured to add noise gradually to an input normal-dose image by Markov chain to obtain a pure noisy image, and the backward inference structure is configured to divide an input CT image into different strips based on UNet model and at the same time, by backward inference, denoise each strip gradually to generate a denoised strip sequentially, and splice the generated denoised strips into a denoising result; wherein an overlap rate is set between the strips;

a model training module, configured to input the obtained normal-dose CT image into the strip diffusion model, and by mean square loss function, calculating a difference between the noise added by the forward diffusion structure and a noise predicted by the UNet model to train the entire strip diffusion model;

a test module, configured to input the obtained low-dose CT images with the CTDI values being the preset ratio of the CTDI value of the normal-dose CT image as test data into the trained strip diffusion model to obtain a denoised low-dose CT image.

Based on the same invention idea, a third aspect of the present disclosure provides a non-transitory computer readable storage medium, storing computer programs, wherein the programs are executed by a processor to perform the zero-shot low-dose CT image denoising method based on strip diffusion model according to the first aspect.

Based on the same invention idea, a fourth aspect of the present disclosure provides A computer device, comprising a memory, a processor and computer programs stored on the memory and run on the processor, wherein the processor executes the programs to perform the zero-shot low-dose CT image denoising method based on strip diffusion model according to the first aspect.

Compared with prior arts, the present disclosure has the following advantages and beneficial effects.

In the zero-shot low-dose CT image denoising method based on strip diffusion model in the present disclosure, the low-dose CT images with different thicknesses are obtained for test, and relevant normal-dose CT images are collected for model training, without exact pairing; the strip diffusion model is constructed; in the training process stage, noise is gradually diffused to the normal-dose image to generate a noisy target image; based on the low-dose CT image, block division is performed while noise is gradually removed by backward inference to sequentially generate a denoised strip and finally the denoised strips are spliced into a denosing result. In the present disclosure, the strip diffusion model is applied to reconstruction of the low-dose CT image, lowering the model training difficulty. In the prior arts, due to ethical limitation, it is usually difficult to obtain the CT images of paired doses. In the present disclosure, only normal-dose CT images are required to train the entire model. In addition, the diffusion model has a big advantage in protection of raw details. The complex structures and details of the images can be captured while the image noises and artifacts can be well removed. Besides, the processing results of the method of the present disclosure and the existing advanced method are delivered to the doctors in radiology department for blind review, and the method of the present disclosure achieves the optimal result.

BRIEF DESCRIPTION OF THE DRAWINGS

In order to more clearly describe the technical solutions in the embodiments of the present disclosure and in the prior arts, the drawings required for descriptions of the embodiments or the prior arts are briefly introduced below. Apparently, the drawings described hereunder are only some embodiments of the present disclosure. Those skilled in the arts can also obtain other drawings based on these drawings without carrying out creative work.

DESCRIPTION OF THE EMBODIMENTS

In the present disclosure, a new zero-shot strip scanning diffusion model is built. The model competes end-to-end denoising of the low-dose CT images with different doses, thicknesses or devices based on high fidelity of the diffusion model. Particularly, in the training process, only the normal-dose CT images are required, greatly reducing the data reliance of the model, and model training across dose and thickness condition can be carried out with the data of only one scenario. In a sampling process, strip scanning strategy is used in combination with overlapped strip information and the input low-dose CT images to solve the maximum a posteriori (MAP) problem, thereby sequentially generating denoising results. The present disclosure only uses simple convolution and attention architecture and carries out extensive experiments on the datasets involving different doses and thicknesses. The results show that the method of the present disclosure is superior to the supervised method in most cases, and the visual and blind reviews show that the method of the present disclosure is very close to the normal-dose CT image.

In order to make the objects, technical solutions and advantages of the embodiments of the present disclosure clearer, the technical solutions of the embodiments of the present disclosure will be clearly and fully described below with the drawings in the embodiments of the present disclosure. Apparently, the embodiments described herein are only some embodiments of the present disclosure rather than all embodiments. All other embodiments obtained by those skilled in the arts based on the embodiments of the present disclosure without carrying out creative work shall fall within the scope of protection of the present disclosure.

Embodiment 1

The present disclosure provides a zero-shot low-dose CT image denoising method based on strip diffusion model, which includes the following steps.

at step S1, obtaining a normal-dose CT image under a conventional scanning condition, and based on a CTDI value under the conventional scanning condition, obtaining low-dose CT images with CTDI values being a preset ratio of the CTDI value of the normal-dose CT image and obtaining low-dose CT images with different thicknesses;

at step S2, building a strip diffusion model including a forward diffusion structure and a backward inference structure; where the forward diffusion structure is configured to add noise gradually to an input normal-dose image by Markov chain to obtain a pure noisy image, and the backward inference structure is configured to divide an input CT image into different strips based on UNet model and at the same time, by backward inference, denoise each strip gradually to generate a denoised strip sequentially, and splice the generated denoised strips into a denoising result; where an overlap rate is set between the strips;

at step S3, inputting the obtained normal-dose CT image into the strip diffusion model, and by mean square loss function, calculating a difference between the noise added by the forward diffusion structure and a noise predicted by the UNet model to train the entire strip diffusion model;

at step S4, inputting the obtained low-dose CT images with the CTDI values being the preset ratio of the CTDI value of the normal-dose CT image as test data into the trained strip diffusion model to obtain a denoised low-dose CT image.

Specifically, the CTDI value is a CT Dose Index which refers to a radiation dose received by a subject within a ray plane in a CT examination. The preset ratio refers to a percentage value of the CTDI value of the low-dose CT image in the CTDI value of the normal-dose CT image, which can be set based on actual situations. For example, based on the CTDI value under the conventional scanning condition, CT images with the CTDI values being 25% and 50% of the CTDI value of the normal-dose CT image are obtained as low-dose CT images. Different thicknesses such as 1 mm (millimeter), 2 mm and 3 mm can be selected based on actual situations. In the model training process, only the conventional-dose (normal-dose) 3 mm CT image (slice) can be used. In the test process, 3 mm-thick CT image slices of 25% and 50% doses, and 1 mm-thick CT image slices of 25% and 50% doses are used.

In a specific implementation process, in the step S1, a public dataset Mayo2016 is used. The Mayo dataset provides CT data of two thicknesses 1 mm and 3 mm. This dataset provides corresponding low-dose CT and normal-dose CT data, where the low dose is 25% of the normal dose, and the data includes the scanning data of a total of ten patients. In this embodiment, the data of 9 patients is randomly selected for model training and the data of one patient is used for test.

In order to verify the effect of the model on the data of different doses, the true data of dead piglets is selected. The data is scanned by a GE device, and each scan includes 850 CT images. The data of normal-dose CT, the data of 25% low-dose CT and the data of 10% low-dose CT are respectively selected. In order to further verify the model on different devices, a breast prosthesis is scanned by using GE (General Electric Company) and Siemens devices respectively.

In this embodiment, the breast prosthesis provided by the GE is used. The prosthesis shows consistent volume, size and density in different anatomical structures such as lung, vertebra, chest wall and mediastinum and the like, and is very close to the soft tissue and bone density in the corresponding region of the human body. In a CT scan process, the phantom shows the same x ray decay characteristics as the human body, such that the acquisition of the CT value is very close to the anatomical structures of the human body. We configure the GE device as 120 kV and 300 mA to obtain chest data of normal dose, and then adjust a tube current to obtain the data of the low dose equal to 25% of the normal dose. Next, with the CTDI values provided by the GE device as standard, the CT data of the normal dose and 25% dose are configured on the Siemens device to correspond to the CTDI values. The two devices both perform scan with a scanning layer thickness of 0.625 mm, repeating five times for each scan, with four times for training and one for test.

In the step S2, an overlap rate is set between the strips, and the value of the overlap rate can be set to, for example, 25% or 32% or the like based on situations.

The step S3 is a model training process. In one embodiment, in the training process, the image is cut into five strips and the overlap rate of 25% is set between the strips. The first strip is unconditionally generated, and the noise corresponding to the strip is predicted only by a null value. The noise is generated for the following four strips, with the information of the previous strip as condition. Finally, the difference between the predicted noise and the noise added by the forward process is calculated by the mean square loss function, thereby completing the entire model training.

The present disclosure designs a new strip scanning zero-shot denoising method. In the entire framework, only the normal-dose CT image for training is required to realize end-to-end denoising of the low-dose CT images. Specifically, the entire CT image is divided into different strips and an overlap rate is set between the strips. Each strip is generated gradually by the overlap information of the previous strip, which skillfully solves the training problem of the entire image. Furthermore, without scaling and dimension reduction, the retention of the raw details is improved.

In one embodiment, the probability distribution of the noisy image of the t-th step obtained by the forward diffusion structure is:

$$q(x_t|x_{t-1})=N(x_t;\sqrt{1-\beta_t}*x_{t-1},\beta_t);$$

where $\beta_t$ is a Gaussian noise variance added at the t-th step, N is a Gaussian distribution, $x_t$ is a noisy image obtained at the t-th step, $x_{t-1}$ is a noisy image obtained at the (t−1)-th step, and $q(x_t|x_{t-1})$ is a probability distribution of $x_t$ with $x_{t-1}$ known.

Specifically, the forward diffusion structure only inputs a normal-dose image and adds noise gradually by Markov chain. The image of any t-th step can be obtained by the initial $x_0$. For example, the total number of iteration steps is set to T and the pure noisy image finally obtained is $x_T$.

In one embodiment, the UNet model includes an encoder, a middle layer, a decoder, a time encoder and a position encoder. The encoder includes a 3×3 convolutional block and an upsampling convolutional module, the middle layer includes a convolutional layer, the decoder includes a 3×3 convolutional block and a downsampling convolutional module, the time encoder is configured to encode a current time, and the position encoder is configured to encode a current strip. Time-encoded and position-encoded features are fused and then added to the middle layer of the UNet model, the last layer of the encoder and the last layer of the decoder.

In one embodiment, the noise predicted by the UNet model is calculated as below:

$$\hat{\varepsilon}^0=UNet(x^0,0)$$

$$\hat{\varepsilon}^k=UNet(ax^{k-1},k)$$

where $x^0$ is a null value, $\hat{\varepsilon}^0$ is a noise predicted for the first strip, k is a number of strips divided, a is an overlap rate, $x^{k-1}$ is a content of the (k−1)-th strip, and $\hat{\varepsilon}^k$ is a noise predicted for the k-th strip.

Specifically, if the input image is divided into five strips, the input condition of the first strip is the null value $x^0$, and the input condition of the second to fifth strips is the overlap information $ax^{k-1}$ of the previous strip, where the overlap rate a is set to 25%. In the training process, the difference between $\vec{\varepsilon}^k$ and $\varepsilon^k$ is calculated by mean square loss function (MSELoss), where the $\varepsilon^k$ is the noise added by the forward process.

In one embodiment, the 3×3 convolutional block is a residual network block, and the input of the encoder is the noisy image $x_t$ obtained at the t-th step. After rich feature information is calculated by the residual network block, a smaller-size feature map is obtained by the downsampling convolutional module; then, by the middle layer, a more advanced feature representation $x_{mid}$ is learnt and input into the decoder; after the feature map is calculated by the residual network block, the upsampling convolutional module restores image detail structure to obtain a final output feature map.

In one embodiment, by skip connection, the encoder and the decoder add up a corresponding encoder blocks and feature map blocks of the decoder.

Figure 3:
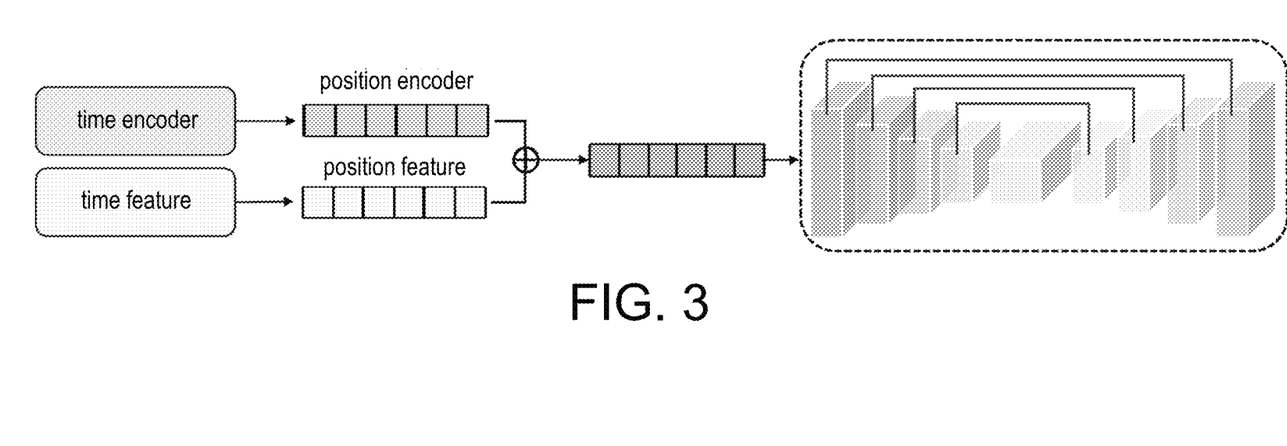
FIG. 3 is a structural diagram illustrating a Unet model according to an embodiment of the present disclosure.

With reference to FIG. 3, it is a structural diagram of the UNet model, where the left four blocks are encoder, the middle block is the middle layer and the right four blocks are decoder. In the UNet, the skip connection is introduced. The four encoder blocks correspond to four decoder blocks respectively, and by the skip connection, the corresponding encoder blocks and feature map blocks of the decoder are added up. In this way, the network can focus on the local details and the global context information at the same time.

In one embodiment, the obtained low-dose CT images with the CTDI values being 25% and 50% of that of the normal-dose CT image are input as test data into the trained strip diffusion model to obtain a denoised low-dose CT image, which includes:

based on the low-dose CT images in the test data, performing strip-by-strip sampling; wherein for a first strip, the denoising result is obtained with the null value and the content of the low-dose CT image as condition, and for the subsequent strips, the denoised low-dose CT image is obtained by introducing partial information of the previous strip for the subsequent strips, and then splicing each denoised strip in an order.

Specifically, the test process is the sampling process and the strips of the low-dose CT image are sequentially denoised and spliced into a complete CT image. The predicted strips may be sequentially represented as $[\hat{x}^1, \hat{x}^2, \ldots, \hat{x}^k]$, where k is 5, representing a total of five strips, $\hat{x}^1$ represents the first predicted strip, $\hat{x}^2$ represents the second predicted strip, and $\hat{x}^k$ represents the k-th predicted strip. The noise $\hat{\varepsilon}^k$ for the k-th strip of the low-dose CT image is removed to obtain $\hat{x}^k$ Finally, the denoised image $\hat{x}$ is obtained by splicing.

The method of the present disclosure will be described below by way of specific examples.

Figure 2:
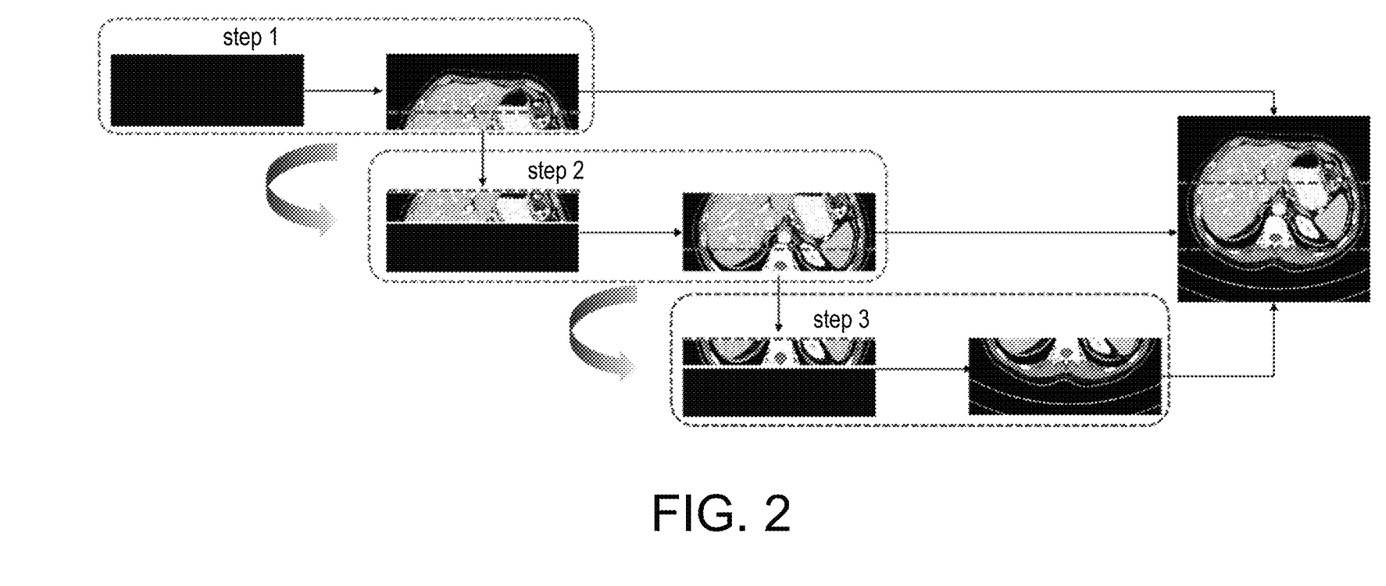
FIG. 2 shows a general framework illustrating a zero-shot low-dose CT image denoising method based on strip diffusion model according to an embodiment of the present disclosure.

As shown in FIG. 2, the entire framework of the zero-shot low-dose CT image denoising method based on strip diffusion model can be carried out by steps. Firstly, the first strip is obtained by only using the null value, and the subsequent strips are generated with the 25% (overlap rate) information of the previous strip as condition to enhance the content controllability. Finally, the different strips are spliced sequentially from top down to obtain a final result.

A CT scanning solution is designed to obtain the low-dose images with different devices, different doses and different slice thicknesses for test. The normal-dose CT images are used for training the entire model. The entire process is image domain post-processing which is used as data basis to construct the strip diffusion model.

In this embodiment, two public datasets are selected and phantom data under different devices are scanned separately. The disclosed dataset Mayo2016 is used. The Mayo dataset provides CT data of two thicknesses 1 mm and 3 mm. This dataset provides corresponding low-dose CT and normal-dose CT data, where the low dose is 25% of the normal dose, and the data includes the scanning data of a total of ten patients. In this embodiment, the data of 9 patients is randomly selected for model training and the data of one patient is used for test. In order to verify the effect of the model on the data of different doses, the true data of dead piglets is selected. The data is scanned by a GE device, and each scan includes 850 CT images. The data of normal-dose CT, the data of 25% low-dose CT and the data of 10% low-dose CT are respectively selected. In order to further verify the model on different devices, a breast prosthesis is scanned by using GE and Siemens devices respectively in this embodiment. In this research, the breast prosthesis provided by the GE is used. The prosthesis shows consistent volume, size and density in different anatomical structures such as lung, vertebra, chest wall and mediastinum and the like, and is very close to the soft tissue and bone density in the corresponding region of the human body. In a CT scan process, the phantom shows the same x ray decay characteristics as the human body, such that the acquisition of the CT value is very close to the anatomical structures of the human body. In this embodiment, the GE device is configured as 120 kV and 300 mA to obtain chest data of normal dose, and then a tube current is adjusted to obtain the data of the low dose equal to 25% of the normal dose. Next, with the CTDI values provided by the GE device as standard, the CT data of the normal dose and 25% dose are configured on the Siemens device to correspond to the CTDI values. The two devices both perform scan with a scanning layer thickness of 0.625 mm, repeating five times for each scan, with four times for training and one for test.

FIG. 3 shows the entire UNet framework structure. The input of the encoder is the noisy image $x_t$ of the current t-th step, and rich feature information is calculated by the residual network block (ResNet block); a smaller-size feature map is obtained by the downsampling convolutional module to reduce a spatial resolution; next, by the Midblock, a more advanced feature representation $x_{mid}$ is learnt. The input of the decoder is the feature $x_{mid}$ processed by the middle layer. After the feature map is calculated by the ResNet block, the upsampling convolutional layer restores image detail structure. In the UNet, a skip connection is introduced. A feature map of one layer of the encoder is connected with the feature map of corresponding layer of the decoder. This way, the network can focus on the local details and the global context information at the same time. The additionally-introduced time encoder and position encoder encode the time t and strip sequence into one-dimensional feature and add it to the middle layer of the UNet model and the last layers of the encoder and the decoder.

In the test process, i.e. in the sampling process, the strips can be sequentially denoised and finally spliced into a complete CT image. The predicted strips can be sequentially represented as $[\hat{x}^1, \hat{x}^2, \ldots, \hat{x}^k]$ and finally spliced into a denoised image $\hat{x}$.

Figure 4:
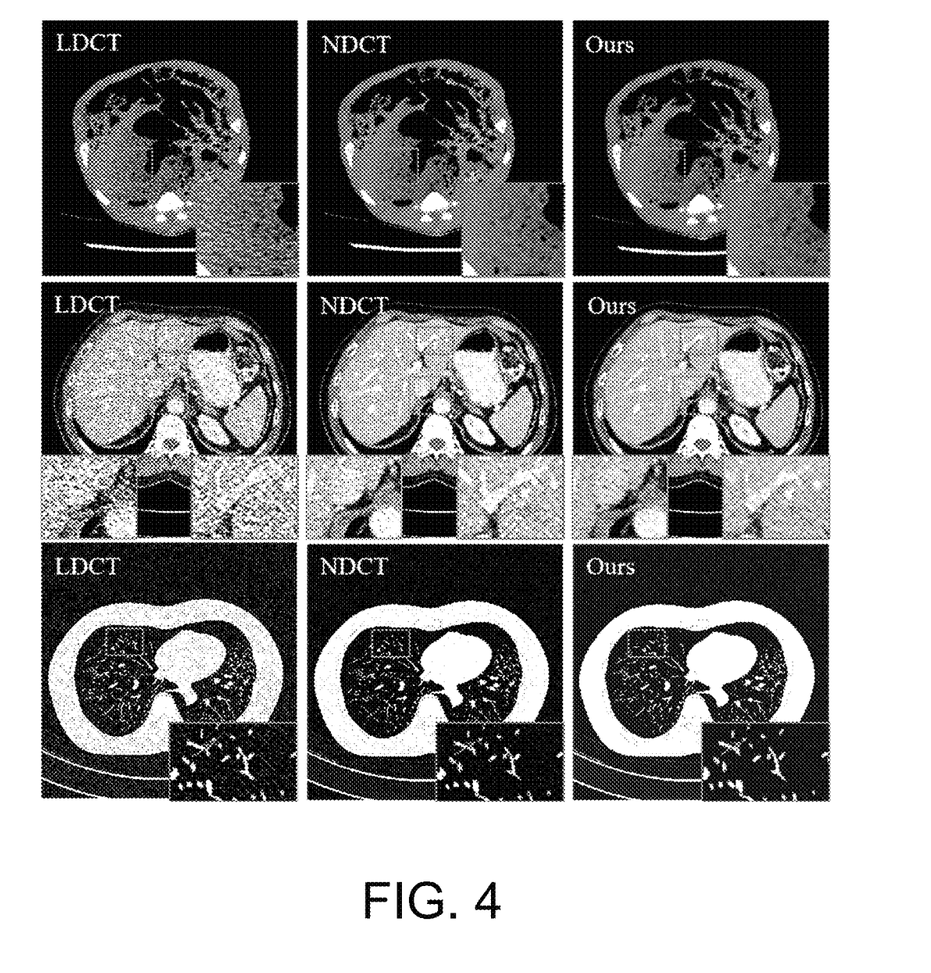
FIG. 4 is a schematic diagram illustrating a denoising result of a representative slice according to an embodiment of the present disclosure.

In the test set, Mayo data, piglet data and phantom data slices are randomly selected and delivered for the doctors in the radiology department to blindly read. Each group of images include known low-dose CT image LDCT and normal-dose image NDCT. The denoising results of other methods are blind, and the methods include Non-Local Means (NLM), Residual Encoder-Decoder Convolutional Neural Network (RED-CNN), Edge enhancement-based Densely Connected Network with Compound Loss (EDCNN), CTformer and the method of the present disclosure. With reference to standard EU CT Evaluation Guidance, evaluation can be carried out according to noise of CT image, structure clearness artifact, and diagnosability. Five-point evaluation method (1 is the worst and 5 is the highest) is used. Table 1 shows the blind review results of the doctors. The method of the present disclosure has the highest level of diagnosability as well as the highest level of retention of the image structure details. The CTformer as a supervised learning method requires simultaneous training for paired low-dose and normal-dose CT images. Although this method has good effect in denoising and artifact removal, the final diagnosability is the worst due to excessive blurring. FIG. 4 shows the denoising effect of the method on the representative slices of the different datasets. In order to more clearly display image details, a region of interest is selected to display the denoising details in an enlarging way. The NDCT is a normal-dose CT image and the LDCT is a low-dose CT image. The Ours represents the denoising result of the present disclosure. The denoising result displayed by the region of interest is very close to the NDCT. The details of the image are retained intact and there is no excessive smoothness on the edge. The image noise is significantly reduced and the visual effect is obviously improved.

TABLE 1

Blind review results of doctors

|  | NDCT | NLM | REDCNN | EDCNN | CTformer | Ours |
|---|---|---|---|---|---|---|
| Denoising effect | — | 1.3 | 3.3 | 3.3 | 3.5 | 4.8 |
| Clearness | — | 2.4 | 2.8 | 2.8 | 3.0 | 4.0 |
| Artifact removal effect | — | 2.0 | 3.4 | 3.4 | 3.6 | 4.2 |
| Diagnosability | 5.0 | 2.4 | 3.4 | 3.4 | 3.7 | 4.4 |

Embodiment 2

Based on the same idea as above, an embodiment of the present disclosure provides a zero-shot low-dose CT image denoising apparatus based on strip diffusion model, which includes:
- a data obtaining module, configured to obtain a normal-dose CT image under a conventional scanning condition, and based on a CTDI value under the conventional scanning condition, obtain low-dose CT images with CTDI values being a preset ratio of the CTDI value of the normal-dose CT image and obtain low-dose CT images with different thicknesses;
- a model building module, configured to build a strip diffusion model including a forward diffusion structure and a backward inference structure; where the forward diffusion structure is configured to add noise gradually to an input normal-dose image by Markov chain to obtain a pure noisy image, and the backward inference structure is configured to divide an input CT image into different strips based on UNet model and at the same time, by backward inference, denoise each strip gradually to generate a denoised strip sequentially, and splice the generated denoised strips into a denoising result; where an overlap rate is set between the strips;
- a model training module, configured to input the obtained normal-dose CT image into the strip diffusion model, and by mean square loss function, calculating a difference between the noise added by the forward diffusion structure and a noise predicted by the UNet model to train the entire strip diffusion model;
- a test module, configured to input the obtained low-dose CT images with the CTDI values being the preset ratio of the CTDI value of the normal-dose CT image as test data into the trained strip diffusion model to obtain a denoised low-dose CT image.

Since the apparatus in the embodiment 2 of the present disclosure is an apparatus used in the zero-shot low-dose CT image denoising method based on strip diffusion model in the embodiment 1 of the present disclosure, those skilled in the arts can, based on the method in the embodiment 1 of the present disclosure, understand the specific structure and variations of the apparatus. Therefore, the redundant descriptions are not made to the apparatus herein. All the apparatuses used in the method in the embodiment 1 of the present disclosure fall within the scope of protection of the present disclosure.

Embodiment 3

Based on the same invention idea as above, the present disclosure further provides a computer readable storage medium, storing computer programs, where the programs are executed by a processor to perform the method in the embodiment 1.

Since the computer readable storage medium in the embodiment 3 of the present disclosure is the computer readable storage medium used in the zero-shot low-dose CT image denoising method based on strip diffusion model in the embodiment 1 of the present disclosure, those skilled in the arts can, based on the method in the embodiment 1 of the present disclosure, understand the specific structure and variation of the computer readable storage medium. Therefore, the redundant descriptions are not made herein. All the computer readable storage mediums used in the method in the embodiment 1 of the present disclosure fall within the scope of protection of the present disclosure.

Embodiment 4

The present disclosure further provides a computer device, which includes a memory, a processor and computer programs stored on the memory and run on the processor, where the processor executes the programs to perform the method in the embodiment 1.

Since the computer device in the embodiment 4 of the present disclosure is the computer device used in the zero-shot low-dose CT image denoising method based on strip diffusion model in the embodiment 1 of the present disclosure, those skilled in the arts can, based on the method in the embodiment 1 of the present disclosure, understand the specific structure and variation of the computer device. Therefore, the redundant descriptions are not made herein. All the computer devices used in the method in the embodiment 1 of the present disclosure fall within the scope of protection of the present disclosure.

Those skilled in the arts should understand that the embodiments of the present disclosure may be provided as methods, systems, or computer program products. Therefore, the present disclosure may take the form of a pure hardware embodiment, a pure software embodiment, or an embodiment combining software and hardware. Furthermore, the present disclosure may take the form of one or more computer program products implemented on one or more computer available storage mediums (including but not limited to disk memories, CD-ROM, optical storage devices, etc.) containing computer available program codes.

The present disclosure is described with reference to the flowcharts and/or block diagrams of the methods, devices (systems), and computer program products disclosed in the embodiments of the present disclosure. It should be understood that each flow and/or block in the flowcharts and/or block diagrams and combinations of flows and/or blocks in the flowcharts and/or block diagrams may be implemented by computer program instructions. These computer program instructions may be provided to a processor of a general-purpose computer, a special-purpose computer, an embedded processing machine, or other programmable data processing devices to produce a machine, so that the instructions executed by the processor of the computer or other programmable data processing device generate an apparatus for implementing functions specified in one or more flows in the flowchart and/or in one or more blocks in the block diagram.

Although the preferred embodiments of the present disclosure have been described, those skilled in the arts can make additional modifications and variations to these embodiments once knowing the basic inventive concepts. Therefore, the appended claims are meant to be interpreted as including the preferred embodiments and all modifications and variations falling within the scope of protection of the present disclosure. Apparently, those skilled in the arts can make various changes and variations to the embodiments of the present disclosure without departing from the spirit and scope of the embodiments of the present disclosure. Thus, if these modifications and variations to the embodiments of the present disclosure fall within the scope of the claims of the present disclosure and its equivalent technologies, the present disclosure is also intended to encompass these modifications and variations.

What is claimed is:

1. A zero-shot low-dose computed tomography (CT) image denoising method based on strip diffusion model, characterized by comprising:
   obtaining a normal-dose CT image under a conventional scanning condition, and based on a computed tomography dose index (CTDI) value of the normal-dose CT image under the conventional scanning condition, obtaining low-dose CT images with CTDI values being a preset ratio of the CTDI value of the normal-dose CT image and obtaining low-dose CT images with different thicknesses;
   building a strip diffusion model, the strip diffusion model comprising a forward diffusion structure and a backward inference structure; wherein the forward diffusion structure is configured to add noise gradually to an input normal-dose image by Markov chain to obtain a pure noisy image, and the backward inference structure is configured to divide an input CT image into different strips based on UNet model and at the same time, by backward inference, denoise each strip gradually to generate a denoised strip sequentially, and splice the generated denoised strips into a denoising result; wherein an overlap rate is set between the strips;
   inputting the obtained normal-dose CT image into the strip diffusion model, and by mean square loss function, calculating a difference between the noise added by the forward diffusion structure and a noise predicted by the UNet model to train the entire strip diffusion model;
   inputting the obtained low-dose CT images with the CTDI values being the preset ratio of the CTDI value of the normal-dose CT image as test data into the trained strip diffusion model to obtain a denoised low-dose CT image.

2. The zero-shot low-dose CT image denoising method based on strip diffusion model according to claim 1, wherein a probability distribution of a noisy image of a t-th step obtained by the forward diffusion structure is:

$$q(x_t|x_{t-1})=N(x_t;\sqrt{1-\beta_t}*x_{t-1},\beta_t);$$

wherein $\beta_t$ is a Gaussian noise variance added at the t-th step, N is a Gaussian distribution, $x_t$ is the noisy image obtained at the t-th step, $x_{t-1}$ is a noisy image obtained at a (t−1)-th step, and $q(x_t|x_{t-1})$ is a probability distribution of $x_t$ with $x_{t-1}$ known.

3. The zero-shot low-dose CT image denoising method based on strip diffusion model according to claim 1, wherein the UNet model comprises an encoder, a middle layer, a decoder, a time encoder and a position encoder; the encoder comprises a 3×3 convolutional block and an upsampling convolutional module, the middle layer comprises a convolutional layer, the decoder comprises a 3×3 convolutional block and a downsampling convolutional module, the time encoder is configured to encode a current time, and the position encoder is configured to encode a current strip;

wherein time-encoded and position-encoded features are fused and then added to the middle layer of the UNet model, a last layer of the encoder and a last layer of the decoder.

4. The zero-shot low-dose CT image denoising method based on strip diffusion model according to claim 3, wherein the 3×3 convolutional block is a residual network block, the input of the encoder is a noisy image $x_t$ obtained at a t-th step; after rich feature information is calculated by the residual network block, a smaller-size feature map is obtained by the downsampling convolutional module; then, by the middle layer, a more advanced feature representation $x_{mid}$ is learnt and input into the decoder; after a feature map is calculated by the residual network block, the upsampling convolutional module restores image detail structure to obtain a final output feature map.

5. The zero-shot low-dose CT image denoising method based on strip diffusion model according to claim 4, wherein by skip connection, the encoder and the decoder add up corresponding encoder blocks and feature map blocks of the decoder.

6. The zero-shot low-dose CT image denoising method based on strip diffusion model according to claim 1, wherein the noise predicted by the UNet model is calculated as below:

$$\hat{\epsilon}^0 = \text{UNet}(x^0, 0)$$

$$\hat{\epsilon}^k = \text{UNet}(ax^{k-1}, k)$$

wherein $x^0$ is a null value, $\hat{\epsilon}^0$ is a noise predicted for a first strip, k is a number of strips divided, a is an overlap rate, $x^{k-1}$ is a content of a (k−1)-th strip, and $\hat{\epsilon}^k$ is a noise predicted for a k-th strip.

7. A computer apparatus, comprising a memory, a processor and computer programs stored on the memory and run on the processor, wherein the processor executes the programs to perform the zero-shot low-dose CT image denoising method based on strip diffusion model according to claim 1.

8. The zero-shot low-dose CT image denoising method based on strip diffusion model according to claim 1, wherein the low-dose CT images with the CTDI values being 25% and 50% of that of the normal-dose CT image are input as the test data into the trained strip diffusion model to obtain the denoised low-dose CT image, which comprises:

based on the low-dose CT images in the test data, performing strip-by-strip sampling; wherein for a first strip, the denoising result is obtained with a null value and content of the low-dose CT image as condition, and for subsequent strips, the denoised low-dose CT image is obtained by introducing partial information of a previous strip, and then splicing each denoised strip in an order.

9. A zero-shot low-dose computed tomography (CT) image denoising apparatus based on strip diffusion model, characterized by comprising:

a data obtaining module, configured to obtain a normal-dose CT image under a conventional scanning condition, and based on a computed tomography dose index (CTDI) value of the normal-dose CT image under the conventional scanning condition, obtain low-dose CT images with CTDI values being a preset ratio of the CTDI value of the normal-dose CT image and obtain low-dose CT images with different thicknesses;

a model building module, configured to build a strip diffusion model comprising a forward diffusion structure and a backward inference structure; wherein the forward diffusion structure is configured to add noise gradually to an input normal-dose image by Markov chain to obtain a pure noisy image, and the backward inference structure is configured to divide an input CT image into different strips based on UNet model and at the same time, by backward inference, denoise each strip gradually to generate a denoised strip sequentially, and splice the generated denoised strips into a denoising result; wherein an overlap rate is set between the strips;

a model training module, configured to input the obtained normal-dose CT image into the strip diffusion model, and by mean square loss function, calculate a difference between the noise added by the forward diffusion structure and a noise predicted by the UNet model to train the entire strip diffusion model;

a test module, configured to input the obtained low-dose CT images with the CTDI values being the preset ratio of the CTDI value of the normal-dose CT image as test data into the trained strip diffusion model to obtain a denoised low-dose CT image.

10. A non-transitory computer readable storage medium, storing computer programs, wherein the programs are executed by a processor to perform the zero-shot low-dose CT image denoising method based on strip diffusion model according to claim 1.

* * * * *